(12) United States Patent
Dickerson

(10) Patent No.: US 9,085,081 B2
(45) Date of Patent: Jul. 21, 2015

(54) MACHINE TOOLS WITH NON-RIGID ROBOT DEVICE USING INERTIAL STIFFENING

(76) Inventor: Stephen Lang Dickerson, Atlanta, GA (US)

( * ) Notice: Subject to any disclaimer, the term of this patent is extended or adjusted under 35 U.S.C. 154(b) by 1171 days.

(21) Appl. No.: 12/686,905

(22) Filed: Jan. 13, 2010

(65) Prior Publication Data
US 2010/0178124 A1 Jul. 15, 2010

Related U.S. Application Data

(60) Provisional application No. 61/144,294, filed on Jan. 13, 2009.

(51) Int. Cl.
*B25J 9/16* (2006.01)
*B25J 19/00* (2006.01)

(52) U.S. Cl.
CPC ............ *B25J 9/1638* (2013.01); *B25J 19/0091* (2013.01); *G05B 2219/39265* (2013.01); *Y10T 409/304312* (2015.01)

(58) Field of Classification Search
CPC ................ B25J 9/1638; B25J 19/0091; Y10T 409/304312
USPC ........................................................ 409/141
See application file for complete search history.

(56) References Cited

U.S. PATENT DOCUMENTS

| 5,201,267 A | 4/1993 | Porucznik |
| 5,425,237 A | 6/1995 | Suer |
| 5,448,146 A | 9/1995 | Erlbacher |
| 6,523,443 B1 | 2/2003 | Hof |

FOREIGN PATENT DOCUMENTS

| EP | 1001184 A2 | 5/2000 |
| EP | 1724054 | 11/2008 |
| WO | 8103518 | 12/1981 |
| WO | 0206005 | 1/2002 |
| WO | 2006115912 | 11/2006 |

OTHER PUBLICATIONS

Stiffness Modeling of a Stewart-Platform-Based Milling Machine, Charles Clinton and G. Zhang of University of Maryland, and Albert Wavering of NIST, Transactions of NAMRI/SME, 1997.
Affordable Accurate Robot Guidance by Variations Reduction Solutions, Inc., SBIR Phase I Final Report on Topic AF091C-001, Nov. 9, 2009.
Economic Policy Institute, "Trade Picture," Feb. 10, 2006 is a well done review of the balance of trade difficulty. At http://www.epi.org/publications/entry/webfeatures_econindicators_tradepict20060210/.

(Continued)

*Primary Examiner* — Moshe Wilensky
(74) *Attorney, Agent, or Firm* — Next IP Law Group LLP

(57) ABSTRACT

A representative machine comprises a non-rigid robotic device having a tool head; and a rigid inertial stiffening system that is part of a tool head and includes a mass to provide precise position of the tool head. The rigid inertial stiffening system achieves high positional precision of the tool head, in the face of large disturbing forces by locally accelerating the mass to counter the disturbing forces.

14 Claims, 6 Drawing Sheets

(56) References Cited

OTHER PUBLICATIONS

Rhim, S., A. Hu, N. Sadegh, W.J. Book, "Combining a Multirate Repetitive Learning Controller with Command Shaping for Improved Flexible Manipulator Control," ASME J. of Dynamic Systems, Measurement, and Control, v123 n 3, Sep. 2001, pp. 385-390.

"Experimental Evaluation of Feed-forward and Computed Torque Control," An, Atkeson, Griffiths, Hollerback. Robotics and Automation, IEEE Transactions, Jun. 1989.

Lee, S.-H. and Wayne Book, "Robot Vibration Control Using Inertial Damping Forces," VIII CISM-IFToMM Symposium on the Theory and Practice of Robots and Manipulators (Ro. Man. Sy. '90), Jul. 2-6, 1990, Cracow, Poland.

Magee, David, David Cannon, and Wayne Book, "Combined Command Shaping and Inertial Damping for Flexure Control," invited paper, Proceedings of the 1997 American Control Conference, Jun. 4-6, 1997, Albuquerque, NM, pp. 1330-1334.

George, Lynanne, and Wayne J. Book, "Inertial Vibration Damping Control of a Flexible Base Manipulator" IEEE/ASME Transactions on Mechatronics, v8 n2, Jun. 2003, pp. 268-271.

K. L. Sorensen, W. E. Singhose, and S. Dickerson, "A Controller Enabling Precise Positioning and Sway Reduction in Bridge and Gantry Cranes," Control Engineering Practice, vol. 15, pp. 825-837, 2007.

Sorensen, K.L., Daftari, A, Singhose, W.E., Hekman, K., "Negative Input Shaping:, Eliminating Overcurrinting and Maximizing the Command Space," Journal of Dynamic Systems, Measurement and Control, Nov. 2008, vol. 130.

K. L. Sorensen and W. E. Singhose, "Command-Induced Vibration Analysis Using Input Shaping Principles," Automatica, vol. 44, pp. 2392-2397, 2008.

Marc Timmerman and Steve L. Dickerson, "High Bandwidth Control of Flexible Robots: Proof of Concept Experiments for Momentum Management," pp. 200-204, May 1, 1990.

MACHINE TOOLS WITH NON-RIGID ROBOT DEVICE USING INERTIAL STIFFENING

CROSS-REFERENCE TO RELATED APPLICATIONS

This application claims the benefit of U.S. provisional patent application Ser. No. 61/144,294 filed Jan. 13, 2009, the entirety of which application is expressly incorporated by reference herein.

TECHNICAL FIELD

The present disclosure is generally related to machine tools.

BACKGROUND

Traditional machine tools, e.g., mill machines that include drill machines, are typically large, bulky and rigid that are very expensive. Current articulated robots, e.g., from KUKA, are repeatable to about 0.004 inches (0.1 mm). Proper calibration in a Euclidian space can add as little as 0.001 inches to overall accuracy giving a reasonable unloaded accuracy of 0.005 inch without any milling (or drilling) load. Today, that calibration would normally be accomplished with the aid of an optical tool such as made by Faro or Lieca. Clearly if the workspace is large, as contemplated here, the space is typically temperature controlled, although it is likely that once again, computed compensation can be used to maintain accuracy in the face of modest temperature changes.

Desirable is a robotic machine built with linear X,Y,Z axis having better repeatability of current machine tools without deflections caused by milling (or drilling) forces.

SUMMARY

A representative machine comprises a non-rigid robotic device having a tool head; and a rigid inertial stiffening system that is part of a tool head and includes a mass to provide precise position of the tool head. The rigid inertial stiffening system achieves high positional precision of the tool head, in the face of large disturbing forces by locally accelerating the mass to counter the disturbing forces.

Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The disclosed apparatus and method are to enable a mill head (and other tooling or machine tooling) to rapidly achieve and consistently maintain precise position with a lower cost total of a milling machine (or drilling machine). This disclosure is based on the premise that robotic machines under dynamic load can achieve accuracy and speed using a combination of sensing, computing, and servo control. Hence the machines can be light in weight and imprecise in their mechanical construction relative to traditional machine tools resulting in lower cost of fabrication. Mechanical repeatability, but possibly not precise fabrication can be preserved in the robotic machine. The disclosure proposed to use the high servo bandwidth to substitute inertia of a mass for mechanical stiffness at the tool head. References to drill herein include mill or any other process that involves stiffening not provided by the robot.

Machining forces can be of the order of, e.g., 300 lbs and vary rapidly. For conventional robots associated with machine tools this deformation is of the order of, e.g., 0.060 inch. With heavy, conventionally-built machine tools this deformation can be held to well under 0.001 inches. The lightweight hexapod machine built by Ingersoll Milling Machine Co. was reported to have an average of about 50 KN/mm spring rate. This would give almost exactly 0.001 inch deflections. A stiffness of about 900 KN/mm is thought to be feasible with the method proposed here giving deflections in approximately 0.00006 inch range.

Figure 1:
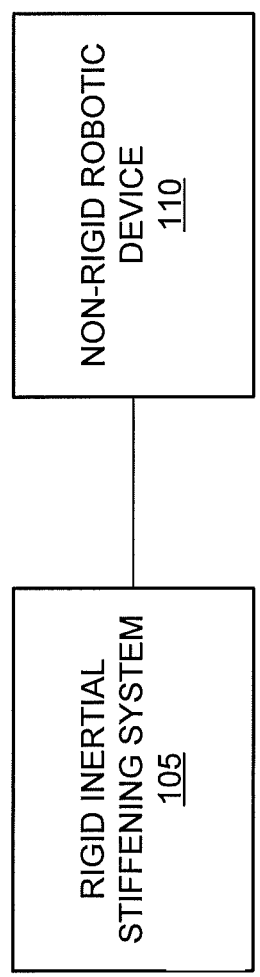
FIG. 1 is a high-level block diagram that illustrates an exemplary robotic machine having an inertia of a mass for mechanical stiffness at the tool head of a non-rigid robotic device in accordance with an embodiment of the disclosure.

FIG. 1 is a high-level block diagram that illustrates an exemplary robotic machine 100 having inertia of a mass for mechanical stiffness at the tool head of a non-rigid robotic device 110. The exemplary robotic machine 100 includes a drill head and is used for drilling. However, it should be noted that a person skilled in the art would appreciate that the robotic machine can be implemented with a mill head or other tooling head. In general, mass is a device that contains five (5) degrees of freedom drives that move a drill head and provide for stiffness. It is accelerated by the forces required to stabilize the position of a drill in the face of drilling forces. The rigid inertial stiffness system is a servo system including software that moves the mass to achieve high mechanical rigidity at the drill. An End-of-Arm (EOA) is where the mass and drill head are generally located. The drill head is a device that rotates the drill (or mill) and is attached to the mass by a five-axis, high-performance servo system.

The robotic machine 100 includes the non-rigid robotic device 110 that is electrically and mechanically coupled to a rigid inertial stiffening system 105 at the tool head. The robot itself has a sophisticated motion control system to avoid mechanical oscillations, be precise in motion in the sense of repeatability and may have the ability to compensate for the deflection caused by the inertial stiffening device for the purpose of re-centering the mass or in anticipation of future cutting forces. The rigid inertial stiffening system 105 is further illustrated and described in relation to FIGS. 2-6.

Figure 2:
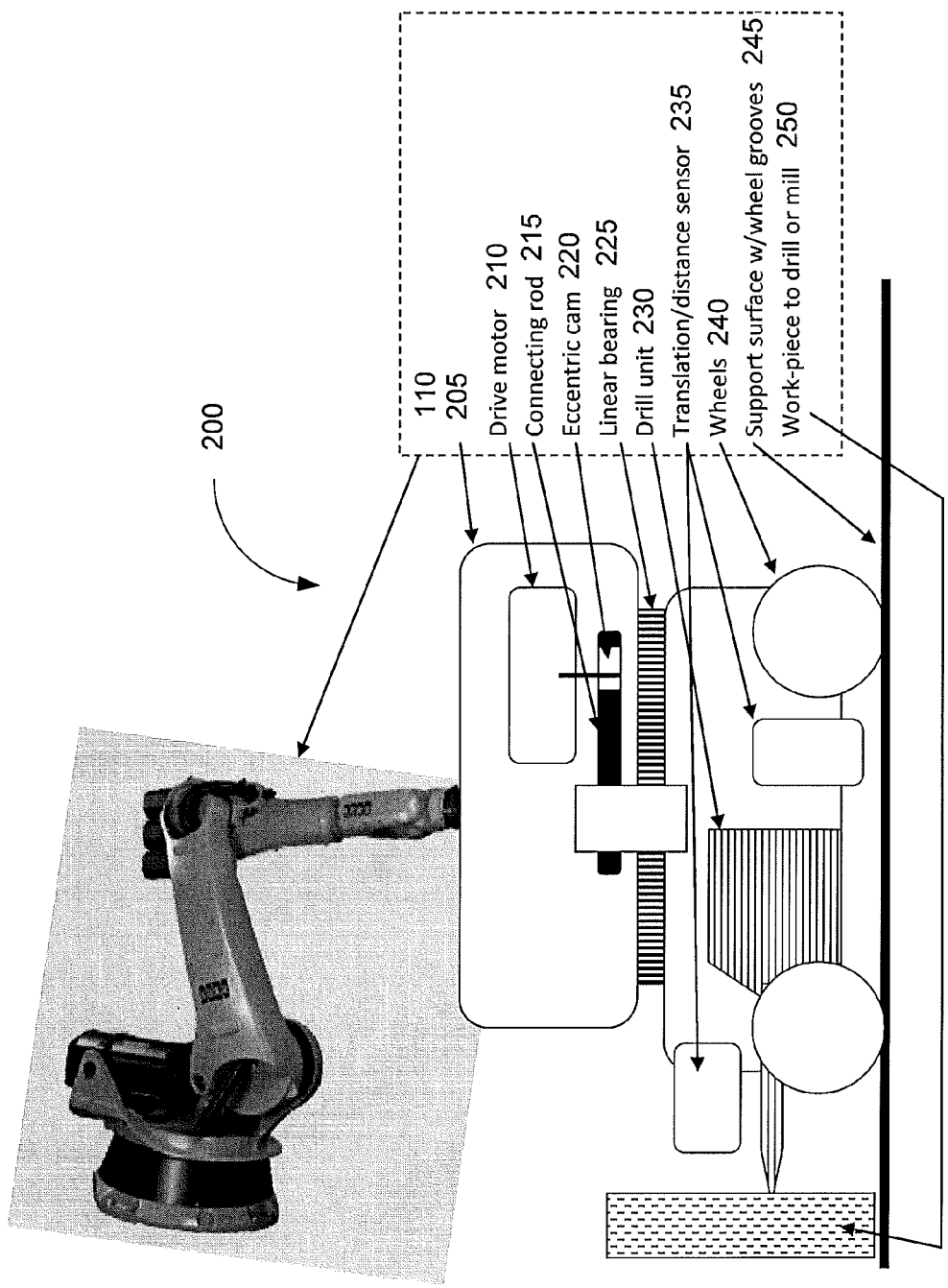
FIG. 2 is a conceptual layout of an apparatus using a KUKA robot having a rigid inertial stiffening system in one degree of freedom stiffening at a tool head of a non-rigid robotic device in accordance with an embodiment of the disclosure.

FIG. 2 is a conceptual layout of an apparatus using a KUKA robot 200 having rigid inertial stiffening system 105 at a tool head of a non-rigid robotic device 110. The exemplary KUKA robot 200 includes a support structure 205 attached to the non-rigid robotic device 110, e.g. a robotic arm. The mass includes a drive motor 210 that is connected to a rod 215. An eccentric cam 220 is coupled to the rod 215. A linear bearing 225 is positioned beneath the support structure 205. A drill unit 230 is positioned beneath the linear bearing 225. At least one translation/distance sensor 235 is positioned in front of the KUKA robot 200. Wheels 240 are coupled to the KUKA robot 200 for mobility. The wheels 240 rotate on the support surface 245 and generally move toward a work piece 250 to mill or drill. This figure illustrates inertial stiffening in one direction only.

Figure 4:
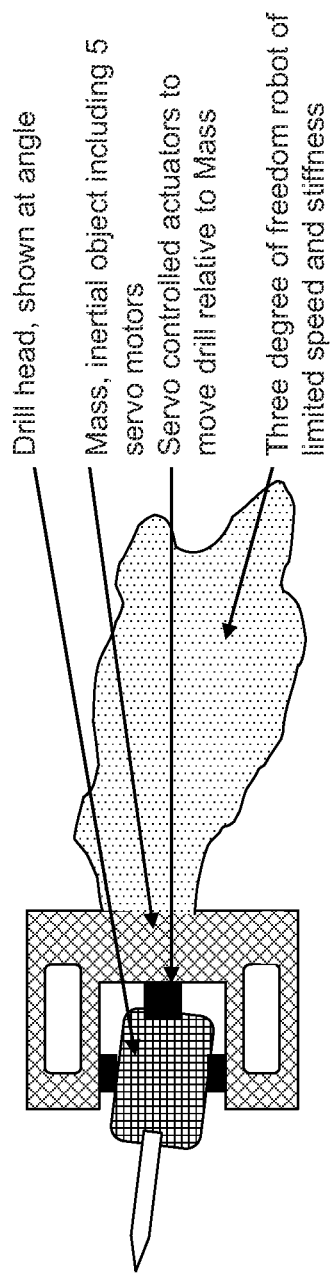
FIG. 4 is a schematic diagram that illustrates an exemplary rigid inertial stiffening system at the tool head of the non-rigid robotic device in accordance with an embodiment of the disclosure.

A reasonable alternative is a gantry style robot, such as made by CAMotion, is able to achieve better repeatability and would allow for less floor space requirements with good access of workers when the drilling heads were parked as illustrated in FIG. 4.

Unlike a large hexapod or conventional machine tool, the method of stiffening disclosed herein allows multiple machining heads quite close together, opening up greater production levels. However, certain measurement and computed compensation can be determined and calculated to maintain accuracy of unloaded position. This is described further in connection with FIGS. 4-6.

Figure 3:
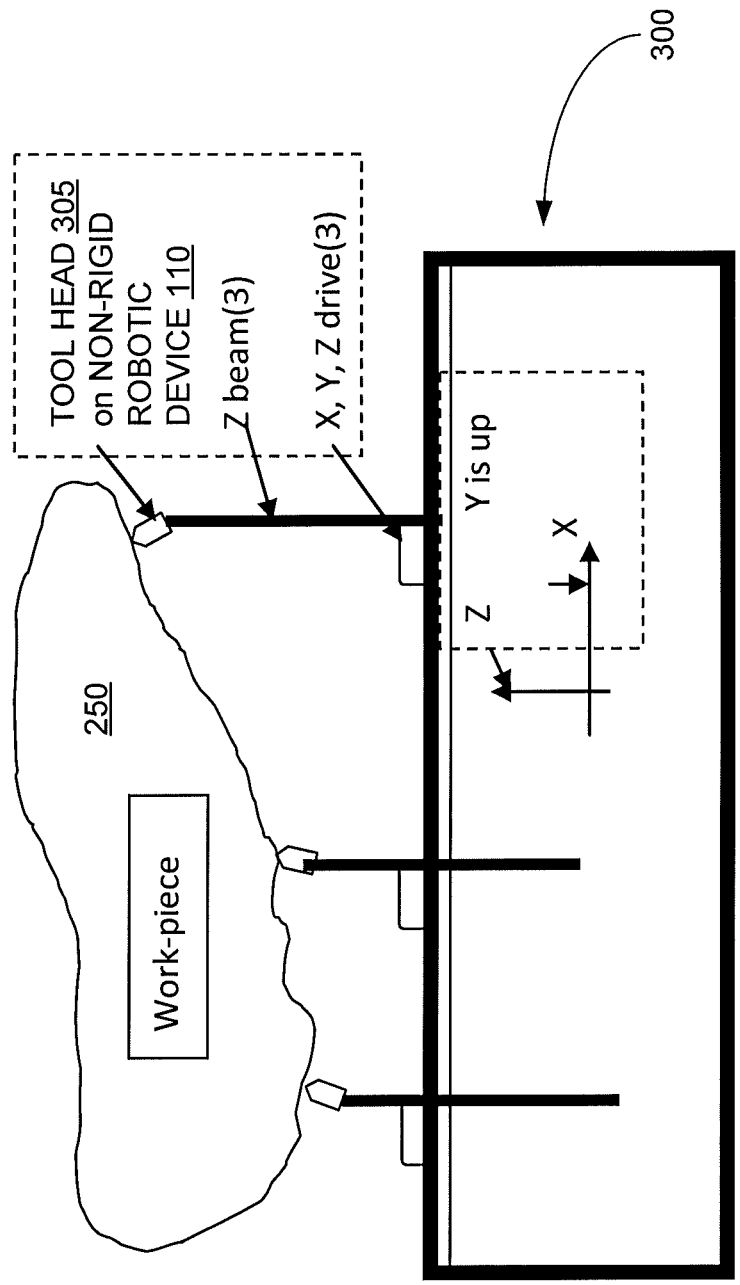
FIG. 3 is a view of an exemplary gantry style robot with three arms having rigid inertial stiffening system at three (3) tool heads in accordance with an embodiment of the disclosure.

FIG. 3 is a view of an exemplary non-rigid gantry style robot 300 with three arms 110 having rigid inertial stiffening system 105 at three (3) tool heads 305. The gantry style robot 300 includes three tool heads 305 on three respective non-rigid robotic devices 110, each having one degree of freedom stiffening. The three tool heads 305 can engage the work piece 250 at three different locations simultaneously or non-simultaneously.

FIG. 4 is a schematic diagram that illustrates an exemplary embodiment of a rigid inertial stiffening system 105 at the tool head of the non-rigid robotic device 110, e.g., robotic arm. The rigid inertial stiffening system 105 generally compensates for robotic mechanical compliance. The force of cutting at the rigid inertial stiffening system 105 is compensated by accelerating a mass 405 located near the cutting tool. The mass 205 can include several servo motors 410, 415, e.g., 5 motors, and can have a "U" cross-sectional shape. A drill head 420 is placed inside the "U" cross-sectional shaped mass 405 and is coupled by servo controlled actuators 425 at the inner walls of the mass 405. The non-rigid robotic device 110 can have three (3) degrees of freedom with limited speed and stiffness.

The acceleration of the mass 405 is accomplished by a high performance servo system 410, 415, 425 that has the objective of maintaining correct position of the mill or drill relative to the surface being machined. The servo system 410, 415, 425 can be part of the mass 405 being accelerated. The mass 405 is generally attached to the end of the non-rigid robotic device 110. As the reaction force from the drill is absorbed by the mass 405, the mass 405 moves to deflect the non-rigid robotic device 110 until such time as the net force on the mass 405 is zero. That is balanced by the force that deflects the non-rigid robotic device 110. The non-rigid robotic device 110 being potentially "spring like" can oscillate in response to the applied force but the rigid inertial stiffening system 105 can continue to respond to keep the drill properly located and the robot's servo system 410, 415, 425 can be designed to both damp the vibrations and move the mass 405 back to its nominal position.

Sophisticated sensing can be used to determine at a high bandwidth the position of the drill or mill. If this sensing provided the relative position of the work-piece and the mill, then the work-piece may itself be less rigidly fixtured than normal.

An alternative fabrication has the non-rigid robotic device 110 (with five (5) degrees of freedom) attached directly to the drill so that the mass 405 can be used to stabilize both the drill and the non-rigid robotic device 110. This has the benefit of no vibration of the non-rigid robotic device 110 but may include a control system of the non-rigid robotic device 110 that have more sophistication and seems to increase the power for the servos. The control system of the non-rigid robotic device 110 can keep the mass 405 close to its nominal position since the force on the drill is compensated by the deflections of the non-rigid robotic device 110.

The robot can have a sophisticated motion control system to avoid mechanical oscillations, be precise in motion in the sense of repeatability and may have the ability to compensate for the deflection caused by the rigid inertial stiffening system 105. These can be appreciated by a person skilled in the art, but may not be routinely incorporated in commercial robots. A discussion of these features is deferred until the discussion of "Robot Motion Control Features."

Figure 5:
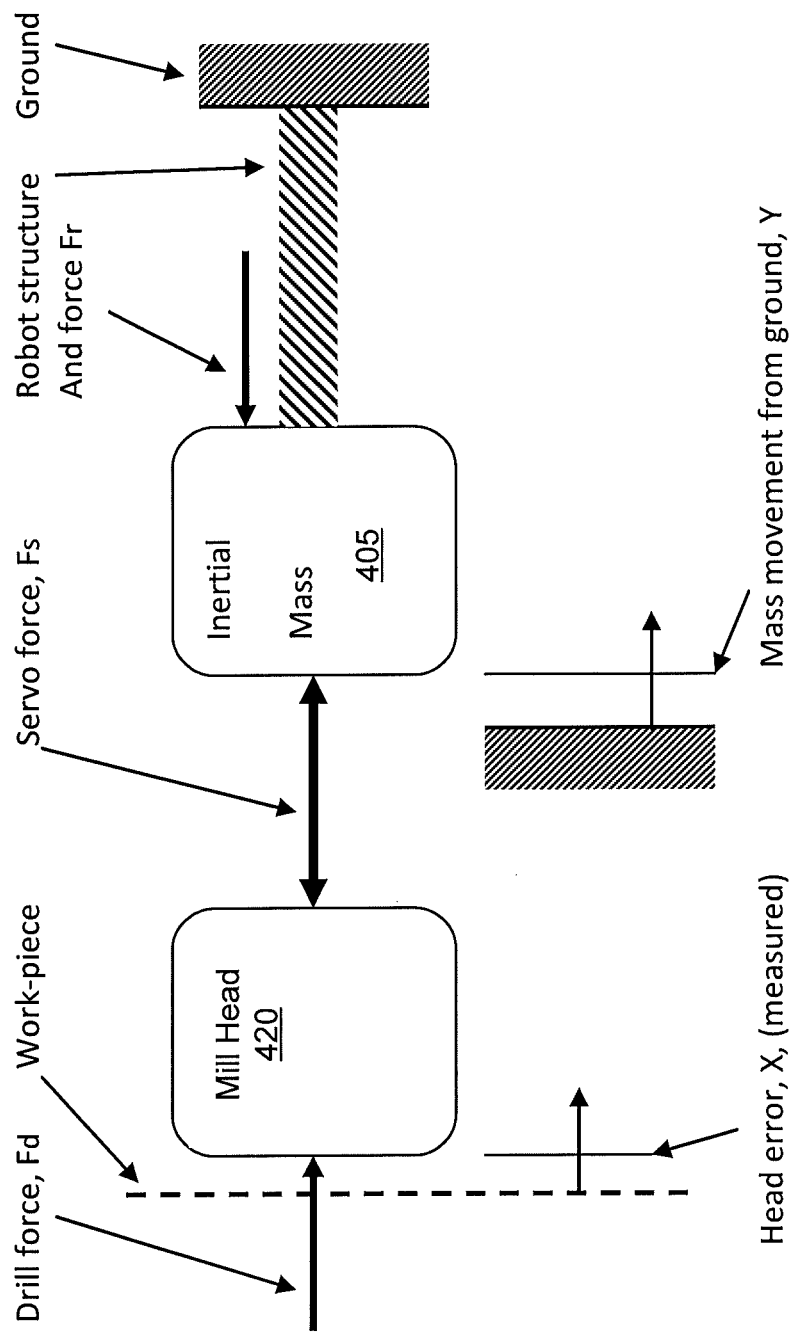
FIG. 5 is a schematic diagram of an exemplary rigid inertial stiffening system in one degree of freedom stiffening in accordance with an embodiment of the disclosure.

FIG. 5 is a schematic diagram of an exemplary rigid inertial stiffening system 105 in one degree of freedom stiffening. For example, consider the following scenario. An axial load of 300 lb (1333 Newton) is suddenly applied to the mill. Note that this is more unfavorable than slow or random application. The mill has a spindle and driving motor that weighs 50 lb. (22.7 Kg). The servo system 410, 415 driving the mass 405 has a bandwidth of 1000 Hz (6280 rad/sec). The mass 405 contains the servo system 410, 415 and weighs 50 lb. (22.7 Kg). The stiffness of the non-rigid robotic device 110 is 10000 lb./in. (1,750,000 n/m). The mass 405 of the non-rigid robotic device 110 can be ignored as a very conservative assumption.

The reasonable consequences of these assumptions are as follows. First, the spindle with mill can move about 0.00006 inch (1.5 microns) before the force can be transferred to the mass 405 by the servo system 410, 415. This can be a result of the 1000 Hz response of the servo system 410, 415. This motion of 0.00006 inch (1.5 microns) represents the error in controlling the mill position. This corresponds to a stiffness of roughly 900 Kn/mm. Second, the mass 405 can move 0.060 inch (1.5 mm) before the non-rigid robotic device 110 is absorbing the entire 300 lbs of force. Third, the maximum velocity of the servo motion in moving the mass 405 can be about 0.4 msec. Fourth, the maximum time to reach the full deflection of 0.06 inch can be about 0.01 seconds. Fifth, the maximum power that can be used by the servo system 410, 415 is less than 600 watts; and sixth, among others, the total payload on the non-rigid robotic device 110 is 400 lbs (45.4 Kg), the two 50 pound items plus the 300 lbs of force.

The assumptions used are conservative. As used in FIG. 5, the non-rigid robotic device 110 can be considered a spring rather than a distributed mass-spring system. Thus the deflection of non-rigid robotic device 110 can be quicker and larger than in actual practice. The mass 405 can oscillate in response to the force on the robot structure. As discussed later, this might be close to correct if no damping is provided by the robot control system. The robot control system can dampen the arms motion as discussed in a later section.

The above case is only for one direction of motion aligned with the mill, the direction with likely the greatest force and hence displacement of the mass 405. A simplifying assumption is that all three linear motions are the same. That is the force of 300 lbs is applied in both the direction of the mill and the two perpendicular directions. Note that the mill direction is called Z and the two perpendicular directions X and Y.

There are two other directions of motion of interest. These might be called, "yaw" and "pitch", assuming the mill rotation can be referred to as "roll." Sample calculations of these cases give approximately the same result if one assumes the radius of gyration of the mass 405 is equal to the offset of the force on the mill with respect to the center of gravity of the mass 405. Hence the angular moments of inertial about the center of gravity are interesting features of the mass 405. The effective mass 405 for purposes of rotation is enhanced by increasing the distance of the servo motors 410, 415 from the mill center line and thus increasing the radius of gyration of the mass. Note that the mill rotation is called θ and the two other angles β and γ.

Figure 6:
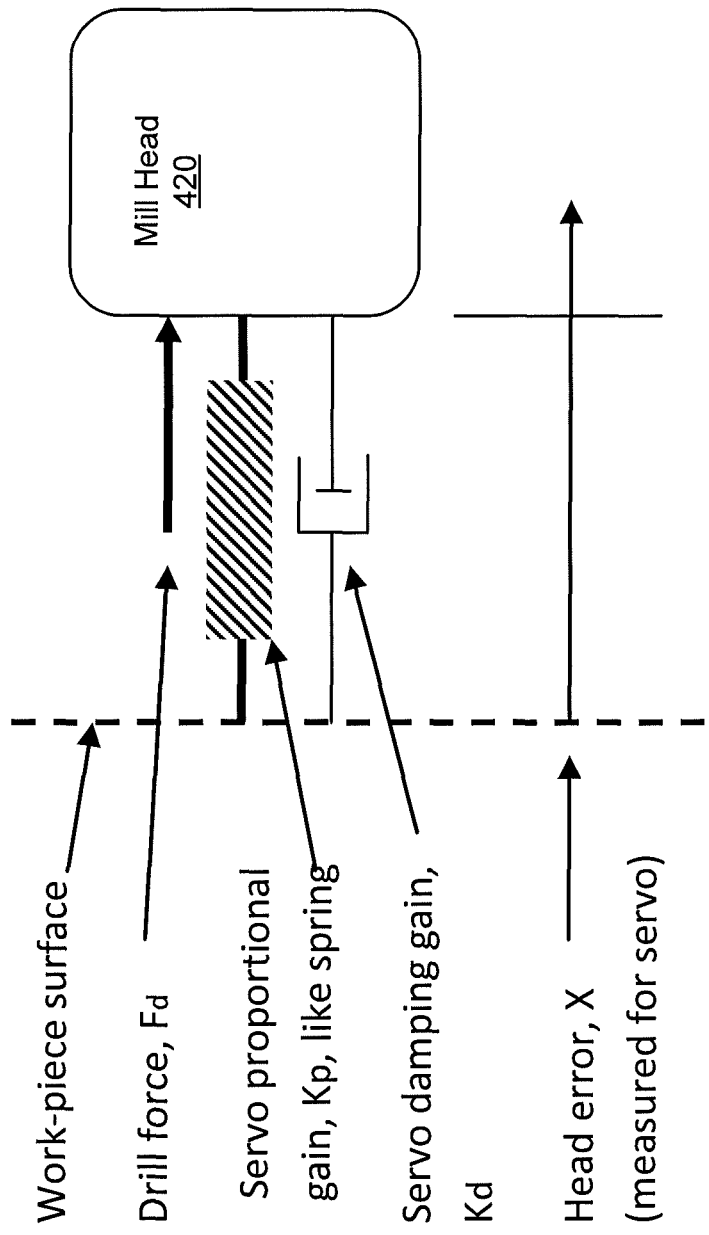
FIG. 6 is a schematic diagram of an exemplary servo system in one degree of freedom stiffening that is related to feedback control in accordance with an embodiment of the disclosure.

FIG. 6 is a schematic diagram of an exemplary servo system 410, 415 in one degree of freedom stiffening. The spring and dashpot can be mechanically achieved as shown or electronically implemented. A proportional plus derivative creation of correcting force in a typical servo system is based on Equation 1 as follows:

$$Fs = Kp*X + Kd*dX/dt \quad (Eq. 1)$$

This is equivalent to tying a spring and dashpot between the work-piece and the mill head. The proportional plus derivative (PD) control force Fs can be applied to both the mill head and the mass 405 to achieve the effect of stabilizing the position of the mill head and moving the mass 405. If the porportional gain, Kp, were infinite, the system can work such that the mill would be maintained precisely in the correct position with respect to the work-piece. But Kp is in fact limited by the "bandwidth" of the servo system 410, 415, 425 which in turn is limited by the frequency at which a measurement of X can be made and the electrical bandwidth in changing the current in the servo motor 410, 415, 425. If one assumes the 1 KHz bandwidth above then measurements at 10 KHz and electrical bandwidth of say 2 KHz are appropriate. Both of these numbers appear to be achievable with commercial components. An exemplary suitable motor is Bodine's eTorq 7 inch. Such a motor has an electrical time constant of 0.00069 seconds or 229 Hz natural frequency. However with a suitable combination of current control and modified windings (if necessary) a bandwidth on torque of 2 KHz can be achieved on motor torque.

It should be noted that the Fs can equal the derivative gain, Fd, at steady state. In the numbers given above it is assumed that the mill force is applied instantaneously. The formula for error then becomes $$X\text{maximum} = Fd/(Md*\omega^2) \quad (Eq. 2)$$

where Md is mass of the mill assembly and ω is the natural frequency or bandwidth in radians/sec.

The Relative Position Measurement System

To implement the high bandwidth, i.e., fast, servo system 410, 415, 425 described above, a servo control can obtain or store data related to the relative position between the mill head 420 (FIG. 4) and the work-piece 250 (FIG. 2) with high accuracy and bandwidth. It is generally relative position that is of concerned even though many machining task are traditionally accomplished by assuming a fixed work-piece 250 that has been accurately fixtured. Both accurate fixturing and rigidity of the work-piece 250 are not precisely true. Hence it is useful to accurately measure the relative location of the fixtured part and mill head 420 and compensate for the deflection of the work-piece 250 as the machining is taking place. Two proposed methods are optical and mechanical, which are described further below.

First, optical methods can be used. The optical systems contemplated are of two types, interferometer sensors to find range from the mill head 420 to the part surface and optical correlation sensors to find relative displacement. Both are likely to be in the micron level capability.

A good example of the correlation technology is imbedded in Cypress Semiconductor's CYONS 1001U. The device is intended to be an optical correlator for a laser mouse. This package integrates the laser generation with the digital correlation having up to 3200 count per inch, 40 kHz max sampling rate, and tracking speed of up to 50 inches per second. This generally tracks X and Y, and so no Z, roll, pitch, or yaw is tracked. The optics is separate and could be arranged to allow say 10000 counts per inch or 2.5 micron resolution and speeds of approximately 16 inches per second. Since the intention of the relative position sensor is to be used to stabilize the position of the mill head 420 relative to the work-piece 250 these specifications are adequate. This type of sensor would allow measurement of the 2 D displacement at the sensor position at a high rate and very precise for small motions. The optic sensor can assist in keeping the mill head 420 proper with respect to the work-piece 250 so the measured motions in X and Y can be a few microns. The sensor data is used to drive the servo motors 410, 415 to implement the rigid inertial stiffening system 105.

To achieve the range sensing there are high speed, small interferometer type sensors. For example, the Micro-Epsilon optoNCDT 1607 has a resolution with 1 mm depth of field of 2 microns at a measurement rate of 37 KHz. Laser displacement sensors using both triangulation and interferometers are quite competitive with suitable units seeming to be available from Acuity, Omron, and Micro-Epsilon, for example. Furthermore non-contact eddy current sensors measure distances, displacements, or positions of any electrically-conductive target in harsh industrial environments (e.g., pressure, dust, and temperature). However, note that measures can be taken to minimize dirt and dust that would interfere with the measurements.

Second, mechanical methods can be used for sensing relative position. For example, the mechanical method can be a contact probe, probably with an array of 3 probes that are used to measure six (6) degrees of motion with respect to the mill head 420. These needle-like probes would be similar to the classic machine tool or CMM probe except that measurement at each probe is in three (3) dimensions, in-out, and the two (2) perpendicular directions.

There is a second mechanical sensing arrangement that might be attractive. That is instead of a needle-like probe that gives three (3) linear displacements at three (3) positions around the mill it would be possible to have a pad pressed against the work-piece 250 with enough force to avoid slippage and measure six (6) degrees of freedom with one (1) probe. The pad may be pressed against the work-piece 250 in existing milling machines for the purpose of preventing delamination in the milling itself. That single pad can provide the position feedback in six (6) dimensions as well.

In both of optical and mechanical methods, the work-piece should be kept clean of the chips produced by milling. For this purpose, the mill head 420 can have a pneumatic system to both blow away chips and can retrieve the chips with vacuum as they are created. In addition, the sensing devices of the robot could be enclosed in a compliant, elastomeric tube that could be pressurized to keep mill chips away from the sensing area.

Absolute Position Measurement System

Absolute position measurement is less desirable in milling or similar processes than relative position measurement system. But most conventional machines use absolute position measurement based on rigid coupling back to servo drives. In the case at hand various optical, mechanical, and inertial based sensing of head position is practical but is not discussed herein as such measurements are well known to a person skilled in the art.

Robot Motion Control Features

The robot motion control is considered well within the state of the art The robot would have a much lower bandwidth control than that of the rigid inertial stiffening system 105. The lower bandwidth can be caused not by the drive servo's lower bandwidth but by the fact that a relatively long mechanism is involved, in this case of several meters length. Thus a change in torque at the drive motors is not immediately reflected as an acceleration of the end-of-arm location where the rigid inertial stiffening system 105 is located. In the case of lighter weight robotics there is more flexibility in the mechanism and hence effectively longer delays.

With limited bandwidth of the robot arm 110 has two considerations:
1. Moving the mill head 420 to the correct position before milling takes time that includes settling time
2. The motion of the end of the robotic arm (EOA) would typically oscillate while milling The ability to control the oscillation when milling, Item 2, would normally be done by what is called state feedback in the robot control system. A simple state feedback involves a velocity and position of the EOA. However, the very fact that the mill head 420 is maintained in proper position (except for moving the mill into the work-piece 250 at a controlled rate), which the rigid inertial stiffening system 105 can generally determine the velocity and position of the mass 405. This data is then fed back to the robot control system with the objective of both controlling oscillations and causing the arm 110 to move to re-position the mass 405 in a favorable, usually nominal position. In response to forces on the mill the mass 405 is moved off nominal to keep the mill fixed. In general, the mass 405 is located in a mid position of the range of the rigid inertial stiffening system 105. However, if the force on the mill is anticipated to be in a particular direction in the near future the nominal position of the mass 405 could be adjusted to allow greater range of mass motion in the rigid inertial stiffening system 105 in the desired direction.

Moving the mill head 420 to the correct position when unloaded, Item 1, should be done at a high rate in order to minimize the process time. Such motions typically result in oscillations that result in a finite settling time. There are three technologies that are part of the intellectual basis to minimize settling time that apply here.

First a technology called command shaping causes the commanded motion of the robot to be such that the oscillations are theoretically zero. But in fact these oscillations are reduced to about 20% in amplitude relative to the typical "S curve" used in most motion control systems. Oscillations are generally the result of stress remaining in the robots structure after the motion has been completed. This stress is essentially a deflection of a spring. Hence the system continues to oscillate once the servos have stopped and the time to bring this to acceptable time is called settling time. Command shaping is generally unable to reduce the oscillations to zero because it is an open loop process that can as a practical matter dampen or remove one or two primary frequencies, which themselves are not known precisely.

Second a technology called learned feed-forward can be used to cause tracking errors at the mass 405 to be minimized. The servo motors 410, 415 can achieve almost perfect motion unlike the motion at the end-of-arm (EOA), the mass 405 in this case. By learning the effort that is involved to make a motion of the mass 405 the feedback servo system is less dependent on the feedback control system and can generally track a motion with about 10% of the error realized by feedback control alone. For completeness in this discussion it is fairly common in control systems to have what is called computed feed-forward. E.g. "Experimental Evaluation of Feedforward and Computed Torque Control," An, Atkeson, Griffiths, Hollerback. *Robotics and Automation, IEEE Transactions*, June 1989], which is also desirable and beneficial and is herein incorporated by reference in its entirety. Both can be used simultaneously in a control system.

Finally there are two beneficial side uses of the rigid inertial stiffening system 105. It can be used to 1) reduce oscillation quicker than convention robotic systems and 2) compensate for offsets in the robot's positioning system. Robot arm oscillations can be reduced by active, servo-controlled motion of a mass at the EOA, which is called, "inertial damping." This capability can be implemented by the rigid inertial stiffening system 105 in software before the mill is in contact with the work-piece. It should be appreciated that a person skilled in the art can implement the inertial damping in various ways, such as, firmware, hardware, or a combination of firmware, hardware, and software.

In some robotic situations, primarily the result of small friction in the joints or linear ways, it is possible to come to a known position that is not exactly the desired position. In fact, this may be the primary cause of less than perfect repeatability. If all the bearings were like air-bearings, with no static friction, the repeatability would be limited mostly by the resolution of the measurement, usually encoders. But if the encoder readings are known, then the final position can be corrected at a controller of the rigid inertial stiffening system 105. This is discussed in the next section, Repeatability And Calibration And Resolution.

Repeatability and Calibration and Resolution

Absolute accuracy of motion is typically a matter of calibration and ability to repeat to the same position as determined in the calibration. Assume the combined robot and controller of the rigid inertial stiffening system 105, have sufficient accuracy of measurement and good control as described above. That still leaves the potential problem of putting the BOA in the desired initial position in the global Euclidean space. Generally a robotic machine or a machine tool itself has repeatability that is much better than accuracy in a Euclidean space. Accuracy is then achieved by, e.g., software that calculates the desired sensor outputs, usually encoders in the robot and Inertia Stiffness unit, to achieve the desired Euclidean position, called True Position. This kind of calculation is known to be done in many large machine tools and relies on a table of correction factors generated in a calibration process.

For the case at hand, calibration can be achieved using optical methods such as those provided by Faro [Laser Tracker Xi]. Calibration to 12 microns (0.0005 inch) for a machine operating in three meter radial range from a single optical device could be achieved. Three meters is adequate for the assumed work space of 3 meters×3 meters×1 meter. Then a Faro device could do a calibration in about 2 hours of which more than an hour would be warm up time. However, this accuracy, 12 microns, is actually one sigma. The appropriate number to use with TP per ASME 5.54 is likely to be four-sigma. The more precise calibration can include a host of laser interferometric range measurement.

The repeatability of the robot or machine tool may not be the actual limit on repeatability at the mill head 420. The repeatability at the mill head 420 is closely related to the resolution of the sensors used to measure the robotic positions because when attempting to return to a position, the encoders may provide a better resolution than machine repeatability. Hence the robot may only be repeatable to approximately <±100 microns=0.0039 inch, [the specification for a Kuka KR 100 HA (High Accuracy robot)] but the encoder readings may be able to distinguish the equivalent of 1 micron steps. That is repeatability may be a combination of control system repeatability and mechanical repeatability. If there is any error at the encoders then that error could be used in a calculation of desired mill head offsets, those calculated offsets could be used to drive the servos in the rigid inertial stiffening system 105 to improve the repeatability of the system as a whole.

A related question is whether a gantry machine of the type built by CAMotion can be more or less repeatable than an arm type machine. One must insure that no parts of the structure in the chain are permanently deformed and that any stiction and friction can be overcome by the servos to an acceptable error. It is reasonable to insist on less than 25 microns (0.001 inch) of error in repeatability. It is not clear that a light weight imprecise machine is inherently less or more repeatable than a standard rigid precise machine tool arrangement, although the lighter structure requires lighter drive components which typically have lower stiction and backlash.

Related to the computed position issue is the effect of work-piece fixturing. In a typical machine tool situation such as the milling situation, the actual fixtured position can be measured by the either the optical calibration device or the robot itself before proceeding with milling. The actual position is also fed into the software to get the desired encoder positions.

Relative position measurement can be used as a supplement to repeatability. That is if various fiducial features or marks are a part of the work-piece these could be referenced by a number of means during the manufacturing process. Commonly a machine vision system or a contact probe would be used. It is possible that they could be adapted, largely by software, to accomplish references to fiducials. Such references may in fact by part of the standard process now in use. That is, under program control, references are made to fiducials as part of achieving and verifying the hole pattern desired Part of the motivation of the technology proposed here is to allow not only drilling but milling to be done by lightweight, imprecise machines. Such a development would likely enable both the invigoration of the domestic machine tool business and reduced cost of manufacturing larger parts. The U.S. machine tool industry supplies approximately one-half of the domestic need, the balance is imported.

The disclosed apparatus and method allows the machine tools generally, and milling machines specifically, to be fabricated without precision or rigidity. Rather modern sensing, computing, and servo systems are able to enable a mill head 420 to rapidly achieve and consistently maintain positional accuracy in machines that are repeatable in position in the unloaded case. Once in contact with the work-piece 420, sensors are used to accurately estimate the relative position, and high-bandwidth servo systems 410, 415, 425 are arranged to enable extremely high stiffness. The arrangement has been described above. Relative position is based on measuring the relative position between work-piece and mill head 420 once contact has been established or imminent. Hence it is feasible to be less concerned with fixturing and rigidity of the work-piece as the mill will follow the work-piece once in contact.

The benefits of low rigidity and precision are greatly reduced fabrication costs for the machines; particularly for machines with large range of motion. Machines of the size contemplated here with work envelopes greater than, e.g., 4 meters×4 meters×1 meter are expected to cost a fraction of those made by conventional means. This savings is not only because of reduced costs of fabricating the machine's structure but also reduced costs of bearings and drives as the moving parts are lighter in weight than would otherwise be required. For example, the cost of high-accuracy robotic milling systems serving large work spaces, such as in the area of aircraft components can be reduced. The technology should be compatible with employing multiple heads or robots simultaneously.

The disclosed apparatus and method is based on the premise that robotic machines achieve accuracy and speed using a combination of sensing and computing. Hence the machines are allowed to be light in weight and imprecise in their mechanical construction. Both of these properties lead to lower cost of fabrication. Mechanical repeatability, but not precise fabrication should be preserved in the robotic machine. Put in the context of machine tools, the robots are designed having less precision, weight (heavy) and stiff structures, but having better repeatability, which is achieved by avoidance of permanent deformations or non-linear phenomena such as backlash and in very precise bearings.

Instead of mechanical stiffness and precision, computing and sensing as well as high performance servo amps are employed. These are currently items of low cost because of the advances in silicon circuits and micro-fabrication. One consequence of the employment of electronic advances is the ability to provide servo control bandwidth that is much faster than the mechanical bandwidth. The disclosed apparatus and method use the high servo bandwidth to substitute inertia for mechanical stiffness at the tool head.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

The invention claimed is:

1. A machine comprising:
a robotic device having a tool head;
a mass that is attached to the tool head;
at least one servo device that facilitates creating the acceleration of the mass; and
at least one drive motor that is designed to move the tool head,
wherein the at least one drive motor facilitates achieving high positional precision of the tool head, in the face of large disturbing forces by locally accelerating the mass to counter the disturbing forces,
wherein the mass is attached to another positioning device that has fewer degrees of freedom than that used by the tool head.

2. The machine as defined in claim 1, further comprising a control system that controls the forces used to accelerate the attached mass, wherein the control system utilizes sensed position of the tool head either absolute position or position relative to a work-piece.

3. The machine as defined in claim 2, wherein the sensing of the position is of high bandwidth of approximately 1000 Hz, so that the positional precision can be enhanced.

4. The machine as defined in claim 2, wherein the relative position is measured using sensors that detect a surface being milled or processed by mechanical contact with the surface or optical observation of the surface.

5. A rigid inertial stiffening system comprising:
a tool head of a robotic device;
a mass that is attached to the tool head, wherein the mass is locally accelerated to counter large disturbing forces to achieve high positional precision of the tool head, in the face of the large disturbing forces; and
at least one servo device that is designed to move the tool head and provide for stiffness, resulting in at least two degrees of freedom stiffening,
wherein the at least one servo device accelerates the mass to counter the disturbing forces,
wherein the mass is attached to another positioning device that has fewer degrees of freedom than that used by the tool head.

6. The rigid inertial stiffening system as defined in claim 5, further comprising a control system that controls the forces used to accelerate the attached mass, wherein the control system utilizes sensed position of the tool head either absolute position or position relative to a work-piece.

7. The rigid inertial stiffening system as defined in claim 6, wherein the sensing of the position is of high bandwidth of approximately 1000 Hz, so that the positional precision can be enhanced.

8. The rigid inertial stiffening system as defined in claim 6, wherein the relative position is measured using sensors that detect the surface being milled or processed by mechanical contact with the surface or optical observation of the surface.

9. The machine as defined in claim 1, wherein the at least one drive motor is part of either the mass or tool head, or both.

10. The rigid inertial stiffening system as defined in claim 5, wherein the at least one servo device is part of either the mass or tool head, or both.

11. A machine comprising:
a robotic device;
a mass that is coupled to the robotic device;
a tool head that is coupled to the mass;
at least one servo device that facilitates creating the acceleration of the mass; and
at least one drive motor that is designed to move the mass,
wherein at least one drive motor facilitates in accelerating the mass to counter disturbing forces,
wherein the mass is attached to another positioning device that has fewer degrees of freedom than that used by the tool head.

12. The machine as defined in claim 11, further comprising a control system that controls the forces used to accelerate the attached mass, wherein the control system utilizes sensed position of the tool head either absolute position or position relative to a work-piece.

13. The machine as defined in claim 12, wherein the sensing of the position is of high bandwidth of approximately 1000 Hz, so that the positional precision can be enhanced.

14. The machine as defined in claim 12, wherein the relative position is measured using sensors that detect a surface being milled or processed by mechanical contact with the surface or optical observation of the surface.

* * * * *